(12) United States Patent
Hong et al.

(10) Patent No.: US 12,296,697 B2
(45) Date of Patent: May 13, 2025

(54) ELECTRIC DRIVE SYSTEM, WHICH IS CHARGED BY HYDROGEN FUEL CELL WHEN PARKING AND EFFICIENTLY DISTRIBUTED BY SECONDARY BATTERIES WHEN DRIVING, BY ADJUSTING DISCHARGE AND REGENERATION OF BATTERIES OFFRONT AND REAR MOTORS ACCORDING TO DRIVING SPEED

(71) Applicants: Sung Yong Hong, Yangju (KR); A-You Jo, Yangju (KR)

(72) Inventors: Sung Yong Hong, Yangju (KR); A-You Jo, Yangju (KR)

(*) Notice: Subject to any disclaimer, the term of this patent is extended or adjusted under 35 U.S.C. 154(b) by 0 days.

(21) Appl. No.: 18/194,627

(22) Filed: Apr. 1, 2023

(65) Prior Publication Data

US 2023/0331099 A1 Oct. 19, 2023

(30) Foreign Application Priority Data

Apr. 15, 2022 (KR) .................... 10-2022-0046761
Apr. 15, 2022 (KR) .................... 10-2022-0046762
Dec. 15, 2022 (KR) .................... 10-2022-0175404

(51) Int. Cl.
  *B60L 50/75* (2019.01)
  *B60L 58/15* (2019.01)
  *B60L 58/40* (2019.01)

(52) U.S. Cl.
  CPC .............. *B60L 50/75* (2019.02); *B60L 58/15* (2019.02); *B60L 58/40* (2019.02); *B60L 2240/642* (2013.01)

(58) Field of Classification Search
  None
  See application file for complete search history.

(56) References Cited

U.S. PATENT DOCUMENTS

2018/0342746 A1* 11/2018 Lee .................... B60L 58/33
2019/0299796 A1* 10/2019 Oyama ................ B60L 58/20
(Continued)

FOREIGN PATENT DOCUMENTS

KR 10-2008-0015157 A 2/2008
KR 10-2018-0109441 A 10/2018

*Primary Examiner* — Jared Fureman
*Assistant Examiner* — Joel Barnett
(74) *Attorney, Agent, or Firm* — Harvest IP Law, LLP

(57) ABSTRACT

The present invention presents an electric drive system that charges the batteries using the hydrogen fuel cell when the vehicle is parked and efficiently distributes and supplies power to front and rear-wheel motors by adjusting the discharge and the regeneration of the batteries according to the driving sections when the vehicle is driven.
The said electric drive system comprises a frame; the front and rear wheels installed on the said frame; the first motor for providing driving force to the said front wheel when driven and generating electricity using the rotation of the same at rest; the second motor for providing driving force to the said rear wheel when driving and generating electricity using the rotation of the same at rest; the first battery that is discharged to supply power to the said first motor and is charged by the power generated by the same; the second battery that is discharged to supply power to the said second motor and is charged by the power generated by the same; hydrogen fuel cell for charging the said first and second batteries; the first motor controller for controlling the operation of the said first motor; the second motor controller for controlling the operation of the said second motor mentioned above; and the battery management system for preventing the overcharging of the said first and second batteries and stores and supplies the power for the same.

5 Claims, 5 Drawing Sheets

(56) References Cited

U.S. PATENT DOCUMENTS

| | | | |
|---|---|---|---|
| 2021/0376627 A1* | 12/2021 | Sato | G01R 31/382 |
| 2022/0314809 A1* | 10/2022 | Yokoo | B60L 58/18 |
| 2023/0264595 A1* | 8/2023 | Gogna | B60L 58/30 |
| | | | 701/22 |

* cited by examiner

[Figure 1]
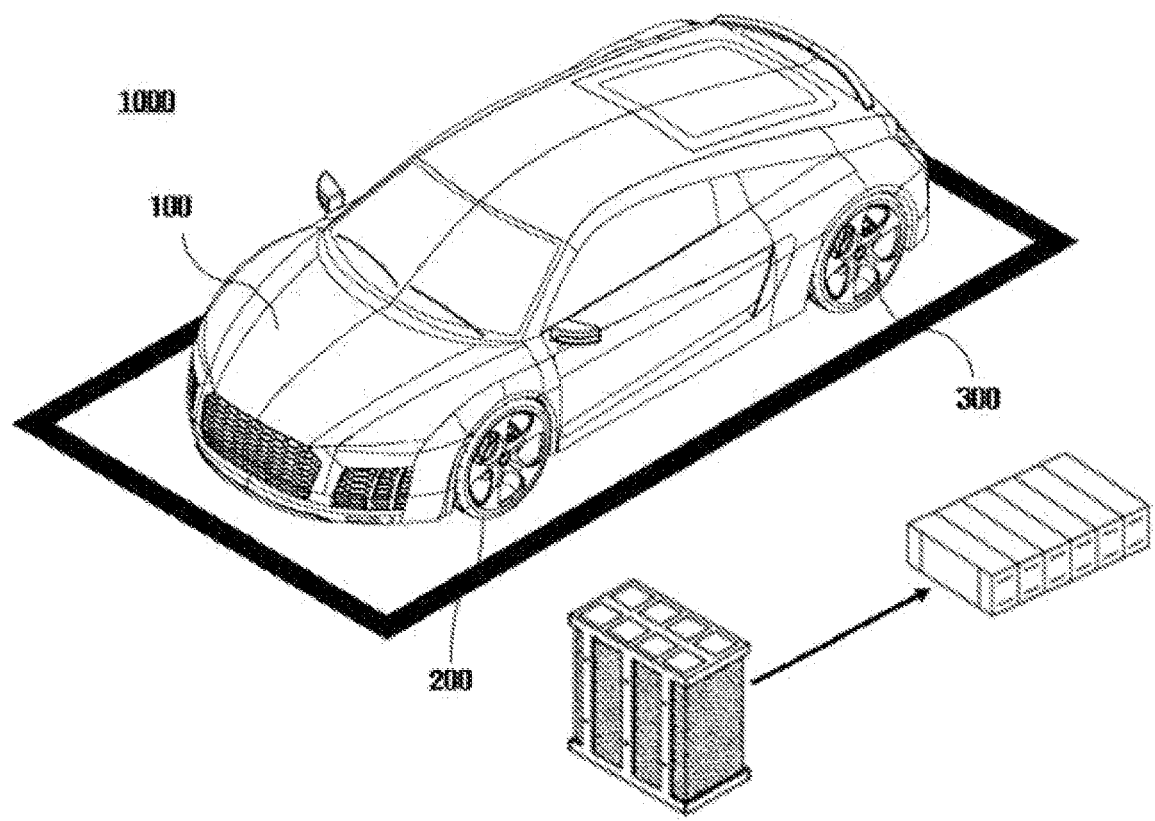

【Figure 2】
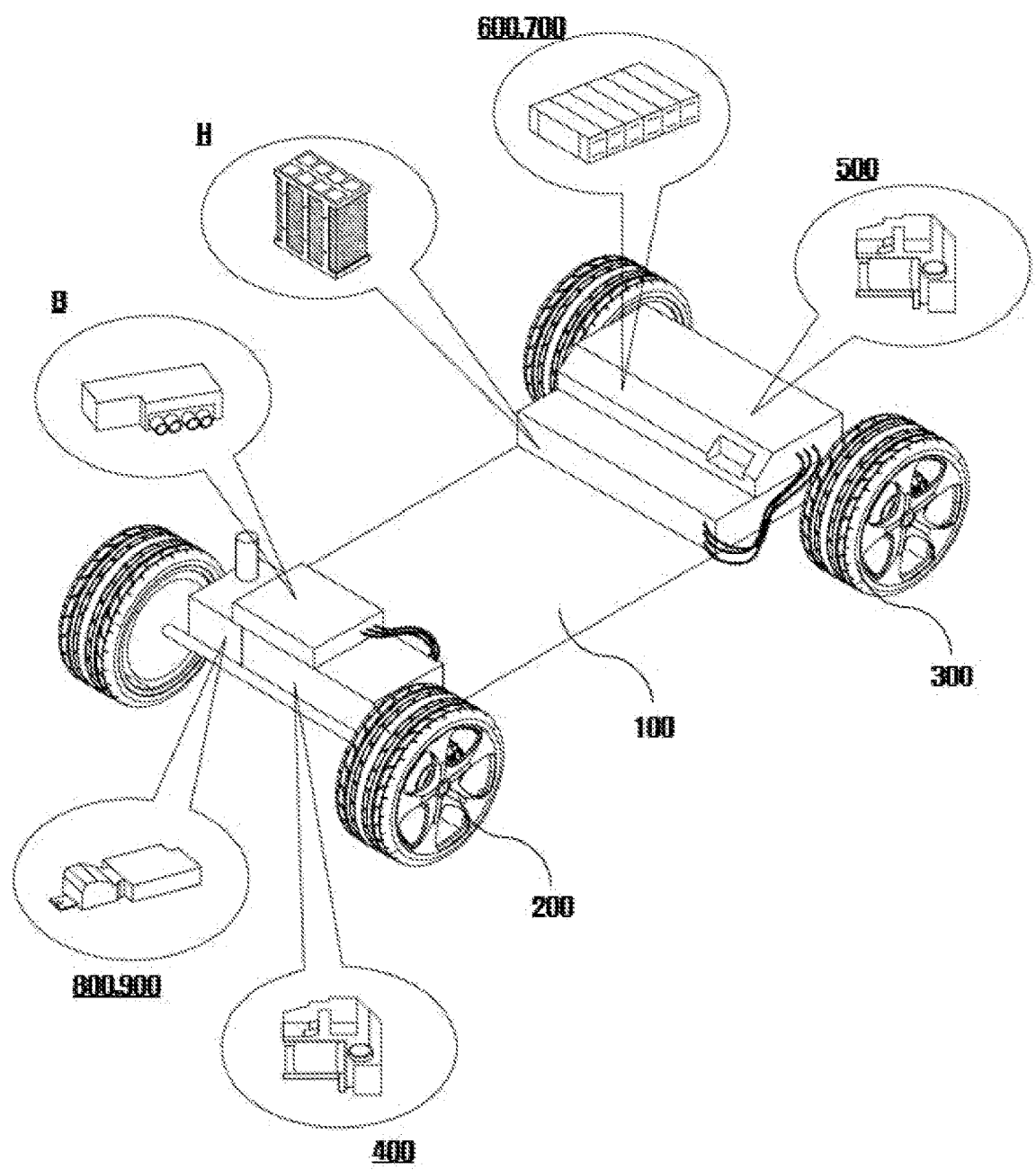

[Figure 3]
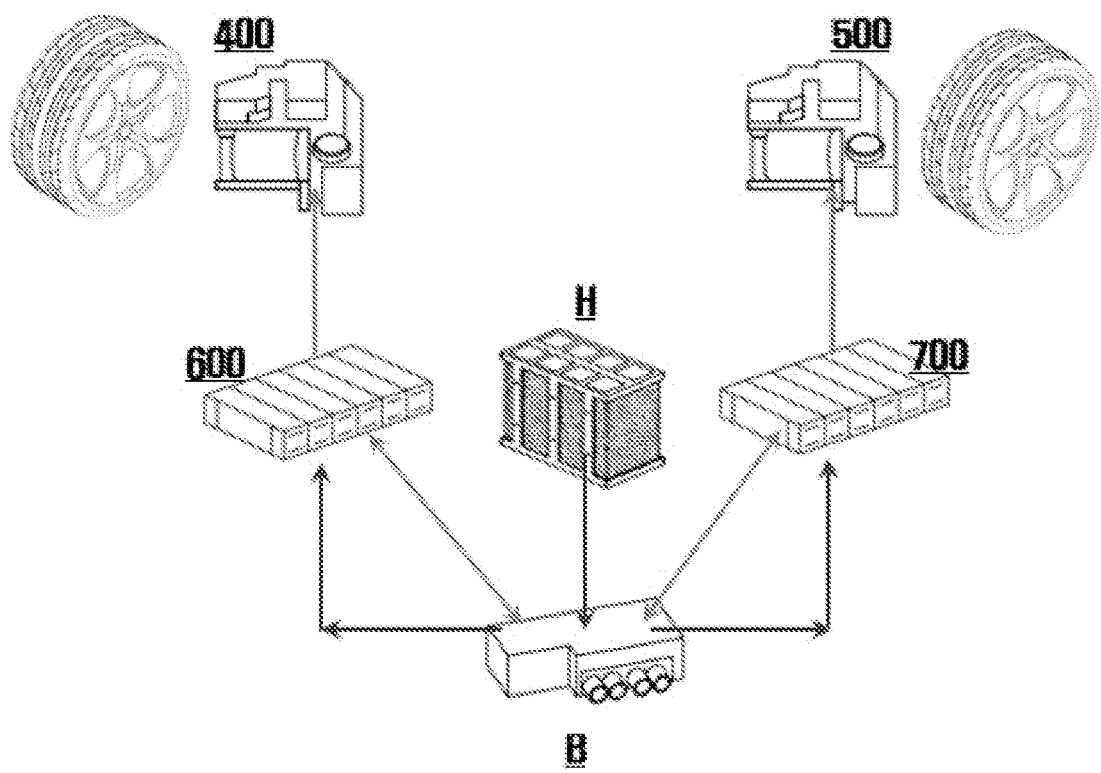

【Figure 4】
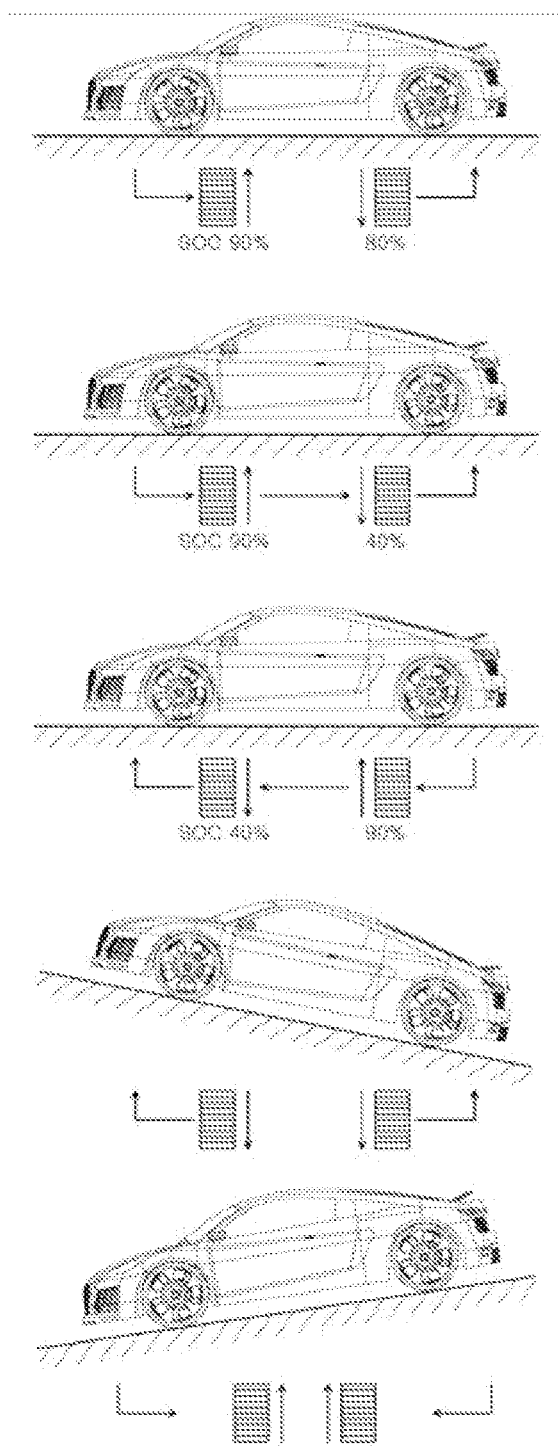

[Figure 5]
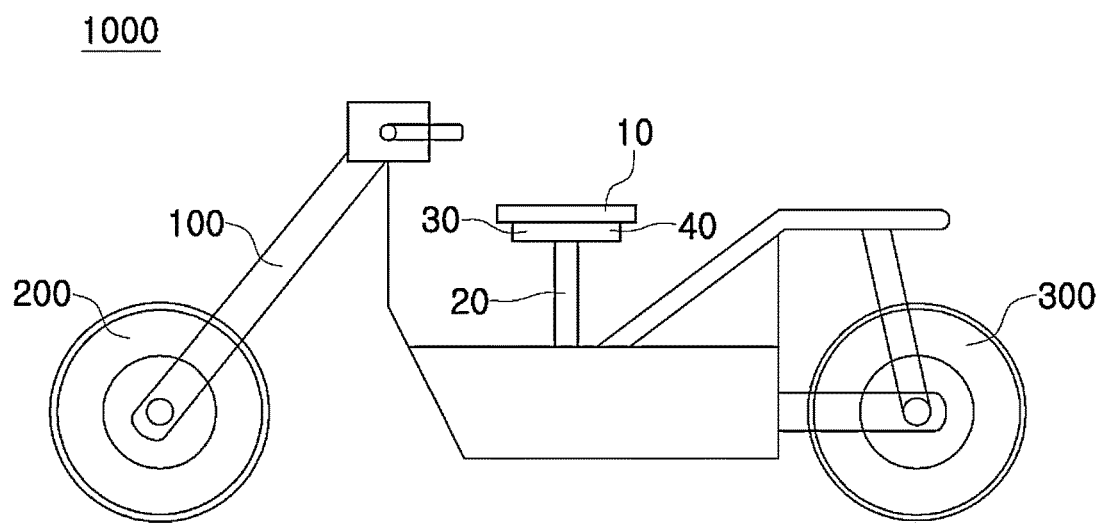

ELECTRIC DRIVE SYSTEM, WHICH IS CHARGED BY HYDROGEN FUEL CELL WHEN PARKING AND EFFICIENTLY DISTRIBUTED BY SECONDARY BATTERIES WHEN DRIVING, BY ADJUSTING DISCHARGE AND REGENERATION OF BATTERIES OFFRONT AND REAR MOTORS ACCORDING TO DRIVING SPEED

CROSS-REFERENCE TO RELATED APPLICATION(S)

A claim for priority under 35 U.S.C. § 119 is made to Korean Patent Application Nos. 10-2022-0046761 filed Apr. 15, 2022; 10-2022-0046762 filed Apr. 15, 2022, and 10-2022-0175404 filed Dec. 15, 2022, in the Korean Intellectual Property Office, the entire contents of which are hereby incorporated by reference.

TECHNICAL FIELD

The present invention is about an electric drive system that charges the batteries using the hydrogen fuel cell when the vehicle is parked and efficiently distributes and supplies power to front and rear-wheel motors by adjusting the discharge and the regeneration of the batteries according to the driving sections when the vehicle is driven.

BACKGROUND ART

A hydrogen fuel cell refers to a type of cell that generates electric energy using hydrogen and is classified as clean energy. It causes the hydrogen extracted from the fuels such as petroleum and gas to react with the oxygen in the air to generate water and electricity. The higher energy efficiency is achieved using the redox reaction, not the existing turbine generation, to generate electricity. The most striking feature of a hydrogen fuel cell lies in its "high efficiency"—different types of cells show different levels of efficiency, but the level usually stays between 40% and 60%. If the heat generated from the fuel cell is harvested and used together, a high efficiency of about 80% and above could be observed. Moreover, the combustion process in the hydrogen fuel cell produces fewer pollutants, and the smaller cell size makes it easier to reserve spaces. Securing the electric and hydrogen safety in hydrogen fuel cells is very important. The basic performance of the cells, as well as their safety and durability, need to be checked regularly through insulation, leak, shock, waterproof, dustproof, and corrosion tests.

On the other hand, in the production, supply, and operation of the fuels used by various vehicles operated in Korea, vehicles with the internal combustion engine emitted twice the amount of greenhouse gases than the eco-friendly ones. Among the vehicles by fuel types, electric vehicles emitted the least amount of greenhouse gas emission, followed by hybrid, diesel, and gasoline vehicles. In this context, many countries, including Korea, are establishing and promoting policies on eco-friendly vehicles.

Electric vehicles use lithium-ion secondary cells as their main power supply; nevertheless, charging the cells mostly involves the use of electricity generated in thermal or nuclear power plants. Therefore, thermal and nuclear power plants are expected to generate more electricity as the demand for electric vehicles increases.

Unlike the internal combustion engine vehicle equipped with a diesel or gasoline engine or the hybrid vehicle that uses the electric motor and the internal combustion engine together, the pure electric personal mobility stands a competitive edge since it does not emit exhaust gases. Since the increase in carbon dioxide levels attributable to fossil fuels was revealed as a cause of global warming, countries are committed to developing and improving the said mobility to reduce carbon dioxide emissions.

Price competitiveness is the biggest difficulty currently faced by the electric vehicle industry. The battery price is expected to drop considerably until 2030; however, for now, the battery price—the largest barrier that hinders electric vehicles from having the edge over the price competitiveness with gasoline vehicles—takes up a third of the electric vehicle price.

One of the alternatives is using an accurate battery management system (BMS), which maintains and manages the voltage, current, and temperature of the battery pack to maximize the efficiency of the battery, predict the battery replacement timing, find the problems with the battery in prior, and efficiently manage the battery.

Furthermore, if the secondary cells can be charged through microgeneration using hydrogen fuel cells—a clean, low-carbon energy source—when parked, the invention should yield positive environment preservation effects and, at the same time, solve the problem presented by the existing rapid/slow charging methods using external power, including the insufficient charging infrastructure in Korea, lower charging efficiency, and the need to use separate adapters and converters.

SUMMARY OF THE INVENTION

Technical Problem

The present invention provides a solution for an electric drive system that charges the batteries using the hydrogen fuel cell when the vehicle is parked and efficiently distributes and supplies power to the front and rear-wheel motors by adjusting the discharge and the regeneration of the batteries according to the driving sections when the vehicle is driven.

The problems the present invention tries to solve are not limited to those stated above, and other problems not mentioned herein shall be understood by one having ordinary skill in the art through the descriptions stated below.

Solution to Problem

To solve the problem mentioned above, the electric drive system in the present invention comprises a frame; the front and rear wheels installed on the said frame; the first motor for providing driving force to the said front wheel when driven and generating electricity using the rotation of the same at rest; the second motor for providing driving force to the said rear wheel when driving and generating electricity using the rotation of the same at rest; the first battery that is discharged to supply power to the said first motor and is charged by the power generated by the same; the second battery that is discharged to supply power to the said second motor and is charged by the power generated by the same; hydrogen fuel cell for charging the said first and second batteries; the first motor controller for controlling the operation of the said first motor; the second motor controller for controlling the operation of the said second motor mentioned above; and the battery management system for preventing the overcharging of the said first and second batteries and stores and supplies the power for the same.

In the parking mode, the said hydrogen fuel cell charges the said first and second batteries. In the start and the low-speed drive mode, the said first motor controller rests the said first motor and charges the said first battery, whereas the said second motor controller operates the said second motor and discharges the said second battery; the said battery management system stores the power in the said first battery if its state of charge is higher than a certain value and supplies the stored power to the said second battery if its state of charge is lower than a certain value.

In the high-speed drive mode, the said first motor controller operates the said first motor and discharges the said first battery, whereas the said second motor controller rests the said second motor and charges the said second battery; the said battery management system stores the power in the said second battery if its state of charge is higher than a certain value and supplies the stored power to the said first battery if its state of charge is lower than a certain value.

In the uphill drive mode, the said first and second motor controllers operate the said first and second motors and discharge the said first and second batteries, whereas the said battery management system provides adequate power to the said first and second motors to prevent the current and the temperature of the said motors from rising higher than a certain value and the torque of the same from falling lower than a certain value.

In the downhill drive mode, the said first and second motor controllers rest the said first and second motors and charge the said first and second batteries, whereas the said battery management system stores the power in the said first battery if its state of charge is higher than a certain value and stores the power in the said second battery if its state of charge is higher than a certain value.

Advantageous Effects of the Invention

The electric drive system in the present invention uses hydrogen fuel cells to automatically charge the vehicle when it is parked without having to charge the secondary cells using rapid chargers (supply direct current power to the secondary cells) or slow chargers (uses a converter to convert alternating current power and supplies direct current power to the secondary cells) installed in parking lots and may solve the problems of (i) looking for a charger due to lack of charging infrastructure, (ii) lower charging efficiency of the rapid and slow chargers than the hydrogen fuel cells (H), and (iii) additional preparation of separate parts, such as adapters and converters for docking.

The electric drive system in the present invention separately controls the front wheels and the rear wheels, selectively switches and operates the charging and discharging of the batteries for the front and the rear wheel motors, and efficiently distributes the surplus charging power using the battery management system according to the driving speed of the electric drive system in 1) the start mode and the low-speed drive mode, 2) the high-speed drive mode, 3) the uphill drive mode, and 4) the downhill drive mode, to maximize and maintain stable battery efficiency.

The benefits of the present invention are not limited to those stated above, and other benefits not mentioned herein shall be understood by one having ordinary skill in the art through the descriptions stated below.

BRIEF DESCRIPTION OF DRAWINGS

FIG. 1 illustrates the concept of the electric drive system in the present invention.

FIG. 2 illustrates the exploded view of the electric drive system in the present invention.

FIG. 3 illustrates the battery management system, batteries, motor controllers, motors, and front and rear wheels in the electric drive system in the present invention.

FIG. 4 illustrates the concept of electronic control according to the drive modes of the electric drive system.

FIG. 5 illustrates a seat of the electric drive system that adjusts a seat position depending on whether a vehicle is moving an uphill or a downhill.

DESCRIPTION OF EMBODIMENTS

The advantages and features of the present invention, and the manner of achieving them, will be apparent from and elucidated with reference to the embodiments described below in conjunction with the accompanying figures. However, the present invention is not limited to the embodiments described below but may be embodied in various forms. The present embodiment is provided to complete the disclosure of the present invention and to fully disclose the scope of the present invention to one having ordinary skill in the art, and only the scope of the claims defines the present invention.

The terminology used herein is for the purpose of describing particular embodiments only and is not intended to be limiting to the present invention. As used herein, the terms "comprises" and/or "comprising" do not preclude the presence or addition of one or more other elements other than the associated listed items. Like reference numerals refer to like elements throughout the specification, and the term "and/or" includes any or all combinations of one or more of the associated listed items. Even though the terms "first," "second," and their likes are used to describe various associated listed items, the said terms are not limited by these terms used to differentiate one element from another. Therefore, it will be understood that the first element described hereafter may also be referred to as the second element in the specification of the present invention.

Unless otherwise defined, all terms (including technical and scientific terms) used herein have the same meaning as commonly understood by one having an ordinary skill in the art to which the present invention belongs. It will be further understood that terms defined in commonly used dictionaries will not be interpreted in an idealized or overly formal sense unless expressly so defined herein.

The electric drive system in the present invention (1000) is explained in conjunction with the appended drawings. FIG. 1 is a conceptual drawing of the electric drive system in the present invention, and FIG. 2 is a conceptual drawing of the explosive view of the electric drive system in the present invention. FIG. 3 is a systematic drawing of the battery management system, batteries, motor controllers, motors, and front and rear wheels in the electric drive system in the present invention. FIG. 4 is a concept drawing displaying the electronic control according to the drive modes of the electric drive system in the present invention.

The electric drive system in the present invention (1000) may be a concept that comprises not only the general electric vehicles with a pair of front and rear wheels but also the automobility in which either the front or the rear wheel has the single wheel, and may be applied further to all types of electric drive system without limitation to the number of front and rear wheels.

The electric drive system in the present invention (1000) may comprise a frame (100), front wheels (200), rear wheels (300), a first motor (400), a second motor (500), a hydrogen fuel cell (H), a first battery (600), a second battery (700), a first motor controller (800), a second motor controller (900), and a battery management system (B).

The frame (100) is a member that forms the frame of the electric drive system in the present invention (1000); it may be formed with metals or alloys and may be equipped with parts, such as levers and seats, for user control and mounting. Also, front wheels (200), rear wheels (300), a first motor (400), a second motor (500), hydrogen fuel cell (H), a first battery (600), a second battery (700), a first motor controller (800), a second motor controller (900), and a battery management system (B) may be installed externally or internally onto the frame (100).

The front wheels (200) may be located at the front and rotated to drive the electric drive system in the present invention (1000), and the rear wheels (300) may be located at the back and rotated to drive the electric drive system in the present invention (1000).

The first motor (400) may be a component that provides the toque to the front wheels (200) during operation and generates electricity by the rotation of the front wheels (200) at rest, and the second motor (500) may be a component that provides the torque to the rear wheels (300) during operation and generates electricity by the rotation of the rear wheels (300) at rest. The hydrogen fuel cell (H) may be a component that supplies power to and charges the first battery (600) and the second battery (700) when the electric drive system in the present invention (1000) is parked (parking mode).

On the other hand, the parking mode is a state where both the first motor (400) and the second motor (500) do not operate; it may be set manually by the operation of the driver (realized by the driver operation controller electrically connected to the first and the second motor controllers) or automatically using a separate sensor (not illustrated).

Generally, the first battery (600) and the second battery (700) of an electric drive system, which are secondary cells, need to be charged using a rapid charger (supplies direct current power to the secondary cells) or a slow charger (uses a converter to convert alternating current power and supplies direct current power to the secondary cells) installed in parking lots when the drive system is parked. However, due to the lack of electric vehicle infrastructure, owners may have difficulties finding a charger. The charging efficiency of the rapid and slow chargers is lower than the hydrogen fuel cells (H), and when the rapid/slow chargers are used, one may need to prepare separate adaptors and converters.

Instead, in the parking mode of the electric drive system in the present invention (1000) and when the said drive system is parked, the battery management system automatically (i) stores the power in the hydrogen fuel cell (H) if the state of charge of the first battery (600) is higher than a certain value (for example, when the SOC of the first battery is overcharged (higher than 90%)) and the state of charge of the second battery (700) is higher than a certain value (for example, when the SOC of the second battery is overcharged (higher than 90%)), (ii) supplies the power from the hydrogen fuel cell (H) to the first battery (600) if the state of charge of the first battery (600) is lower than a certain value (for example, when the SOC of the first battery is undercharged (less than 40%)) and the state of charge of the second battery (700) is higher than a certain value (for example, when the SOC of the second battery is overcharged (higher than 90%)), (iii) supplies the power from the hydrogen fuel cell (H) to the second battery (700) if the state of charge of the first battery (600) is higher than a certain value (for example, when the SOC of the first battery is overcharged (higher than 90%)) and the state of charge of the second battery (700) is lower than a certain value (for example, when the SOC of the second battery is undercharged (lower than 40%)), and (iv) supplies the power from the hydrogen fuel cell (H) to the first battery (600) and the second battery (700) if the state of charge of the first battery (600) is lower than a certain value (for example, when the SOC of the first battery is undercharged (less than 40%)) and the state of charge of the second battery (700) is lower than a certain value (for example, when the SOC of the second battery is undercharged (lower than 40%)).

The first battery (600) may be a component that discharges to supply power to the first motor (400) and is charged by the power generated by the first motor (400), and the second battery (700) may be a component that discharges to supply power to the second motor (500) and is charged by the power generated by the second motor (500).

The first motor controller (800) may be a component that controls the operation of the first motor (400) as well as the output power, torque, and rotations per minute of the same, and the second motor controller (900) may be a component that controls the operation of the second motor (500) as well as the output power, torque and rotations per minute of the same.

As an example, a controller allowing the precise control of the DC60V 2000 W_BLDC motor may be used as the motor controller of the electric drive system in the present invention (1000) to control the energy output, regeneration system, start, operation, and power generation system of the motor, and may communicate with the battery management system (B) below using CONTROL CAN (Controller Area Network) technique, but may not be limited to the descriptions above.

According to the description above, the front wheels (200) and the rear wheels (300) of the electric drive system in the present invention (1000) may be independently equipped with motors (400, 500), batteries (600, 700), and motor controllers (800, 900) and therefore be independently controlled.

The battery management system (B) may be a component that automatically detects the state of the first battery (600) and the second battery (700) (for example, SOC, voltage, current, and temperature) to prevent overcharging (in other words, includes battery safety system), store power into the first battery (600) and the second battery (700), and supplying the power from one to another when necessary (in other words, the energy storage system).

The existing battery management system (B) is a system that manages the voltage, current, and temperature of the batteries in real time to prevent problems that may occur in the batteries and extend their safety and life. In general, it is a system that monitors in real-time the state of the secondary battery, which may become defect due to just one overdischarging during the low-voltage state caused by overheating by overvoltage or overcurrent charging, drop SOC in an extremely high temperature by affecting the electrolytes in the cells, cause capacity drop in an extremely low temperature by causing lithium deposition or overheat due to the uneven internal resistance in the tube current, and raise alarms and take preventive measures for the system's safe operation.

The electric drive system in the present invention (1000) advances further from the existing battery management system (B) and produces different operations for each drive modes (start mode, low-speed drive mode, high-speed drive mode, uphill drive mode, downhill drive mode): (i) in start and low-speed drive modes, only the rear wheels (300) with better traction and torque concentration are operated, (ii) in high-speed drive mode, only the front wheels (200) with better RPM concentration and acceleration are operated, (iii) in uphill drive mode (the mode used to climb uphill), both front wheels (200) and rear wheels (300) are operated, and (iv) in downhill drive mode (the mode used to descend downhill), the system rests both front wheels (200) and rear wheels (300), and at the same time, prevents overcharging at rest (battery safety system) and delivers excessive power generated to the drive batteries (energy storage system) in order to maintain the batteries and operate them efficiently.

In this case, DC to DC converters may be used as the battery safety system that detects the SOC of the batteries to, without limitations, shut down the power supply to the overcharged battery or switch the energy storage system (dual system, HV<>HV). Moreover, eight cells may be used to, without limitations, construct a DC60V battery pack with four pieces of DC30V batteries connected in serial or parallel for the first battery (600) and the second battery (700).

On the other hand, the first motor controller (800) and the second motor controller (900) may be controlled according to each mode by the automatic operation of the driver (realized by the driver operation controller electrically connected to the first and the second motor controllers) or automatically using a separate sensor (not illustrated) that detects the road conditions and start of the drive.

In detail, 1) in the start and the low-speed drive mode, the first motor controller (800) rests the first motor (400) and charges the first battery (600), whereas the second motor controller (900) operates the second motor (500) and discharges the second battery (700); the battery management system (B) may be operated to store the power (ESS: energy storage system) in the first battery (600) if the state of charge of the same is higher than a certain value (for example, when the SOC of the first battery is overcharged (higher than 90%)) and supply the stored power to the second battery (700) when the state of charge of the same is less than a certain value (for example, when the SOC of the second battery is undercharged (lower than 40%)).

In addition, 2) in the high-speed drive mode, the first motor controller (800) operates the first motor (400) and discharges the first battery (600), whereas the second motor controller (900) rests the second motor (500) and charges the second battery (700); the battery management system (B) may be operated to store the power (ESS: energy storage system) in the second battery (700) if the state of charge of the same is higher than a certain value (for example, when the SOC of the second battery is overcharged (higher than 90%)) and supply the stored power to the first battery (600) when the state of charge of the same is less than a certain value (for example, when the SOC of the first battery is undercharged (lower than 40%)).

Moreover, 3) in the uphill drive mode (the mode used to climb uphill), the first motor controller (800) and the second motor controller (900) operate the first motor (400) and the second motor (500) and discharge the first battery (600) and the second battery (700); the battery management system (B) may be operated to supply adequate power to the first motor (400) and the second motor (500) to prevent the current and temperature of the first motor (400) and the second motor (500) from going above certain values and the torques from falling below certain values (in other words, it prevents the overcurrent and overheating of the motor and maintains an adequate torque to climb uphill).

Furthermore, 4) in the downhill drive mode (the mode used to descend downhill), the first motor controller (800) and the second motor controller (900) rest the first motor (400) and the second motor (500) and charge the first battery (600) and the second battery (700); the battery management system (B) may be operated to store the power in the first battery (600) if the state of charge of the same is higher than a certain value (for example, when the SOC of the first battery is overcharged (higher than 90%)) and store the power in the second battery (700) if the state of charge of the same is higher than a certain value (for example, when the SOC of the second battery is overcharged (higher than 90%)).

The modified example, shown in FIG. 5, of the electric drive system in the present invention (1000) may include multiple helical first elastic members (30) and multiple second elastic members (40) with the same shape between the bottom of the passenger seat (10) and the seat post frame (20) that supports the seat (10) on the frame (100). The first elastic members (30) may be located beneath the seat (10) and in front of the upper seat post frame (20) (the forward movement direction of the electric drive system), whereas the second elastic members (40) may be located beneath the seat (10) and at the back of the upper seat post frame (20) (the direction that is opposite of the forward movement direction of the electric drive system).

Also, the multiple first and second elastic members (30, 40) are anisotropic shape memory alloy springs that may be set to shrink when cold and return to their original shapes when heated (relative expansion).

Moreover, the modified example, shown in FIG. 5, of the electric drive system in the present invention (1000) may include the first cooler (not illustrated) that cools the multiple first elastic members to shrink, the first heater that heats the multiple first elastic members to return to or maintain their original shapes, the second cooler that cools the multiple second elastic members to shrink, and the second heater that heats the multiple second elastic members to return to or maintain their original shapes, all of which may be electrically connected to and controlled with electric signals by the driver controller in the seat (10) (changes the driving mode according to the driver's automatic change of modes) or sensors (change the driving mode by detecting the road conditions and start of the drive).

As such, the modified example, shown in FIG. 5, of the electric drive system in the present invention (1000) may place multiple first and second elastic members (30, 40) between the seats (10) and the seat post frame (20) to absorb the shocks during driving.

Furthermore, in the uphill drive mode (uphill) of the modified example (not illustrated) of the electric drive system in the present invention (1000), since the first cooler receives the signals from the driver controller or the sensors to cool and shrink the multiple first elastic members (30) located at the front, and the second heater receives the same signals to heat the multiple second elastic members (40) located at the back to return them to or maintain their original shapes, the seat (10) may tilt forwards and allow the driver to maintain a stable posture (prevents the driver from tilting backward). In the downhill drive mode (downhill), since the first heater receives the signals from the driver controller or the sensors to heat the multiple first elastic members (30) located at the front to return them to or maintain their original shapes, and the second cooler receives the same signals to cool and shrink the multiple second elastic members (40) located at the front, the seat (10) may tilt backward and allow the driver to maintain a stable posture (prevents the driver from tilting forwards).

While the exemplary embodiments of the present invention have been shown and described with reference to the accompanying drawings, it will be understood by the one having ordinary skill in the art that various changes in form and details may be made therein without departing from the spirit and the scope of the invention. Therefore, it is to be understood that the embodiments are merely exemplary and not limiting.

The invention claimed is:

1. An electric drive system comprising:
a frame of a vehicle;
one or more front wheel and one or more rear wheel, both being installed onto the frame;
a first motor that provides a torque to the one or more front wheel and generates electricity from the one or more front wheels, and a second motor that provides the torque to the one or more rear wheel and generates the electricity from the one or more rear wheel;
a first battery that discharges to supply power to the first motor and is charged by the power generated by the first motor, and a second battery that discharges to supply the power to the second motor and is charged by the power generated by the second motor;
a hydrogen fuel cell that charges the first and the second batteries;
a first motor controller that controls an operation of the first motor and a second motor controller that controls an operation of the second motor; and
a battery management system that prevents an overcharging of the first and the second batteries, stores the power into the hydrogen fuel cell, and supplies the power stored in the hydrogen fuel cell to at least one of the first and the second batteries,
a plurality of first elastic members and a plurality of second elastic members, both of which absorb shocks during a driving of the vehicle, both comprising shape memory alloy springs configured to shrink when cooled and return to their original shape when heating, and located between a seat and a seat post, the seat post being on the frame and supporting the seat,
wherein the plurality of first elastic members is located on an upper side of the seat post in a forward movement direction of the vehicle, and the plurality of second elastic members is located on the upper side of the seat post opposite to the forward movement direction,
a first cooler that cools the plurality of the first elastic members, a first heater that heats the plurality of first elastic members, a second cooler that cools the plurality of second elastic members, and a second heater that heats the plurality second elastic members,
wherein, in an uphill drive mode of the vehicle, the first cooler cools the plurality of first elastic members, and the second heater heats the plurality of second elastic members, causing the seat to tilt forward to preventing a driver from tilting backward,
wherein, in a downhill drive mode of the vehicle, the first heater heats the plurality of first elastic members, and the second cooler cools the plurality of second elastic members, causing the seat to tilt backward and preventing the driver from tilting forward.

2. The electric drive system according to claim 1,
wherein, in a parking mode, the hydrogen fuel cell is used to charge the first and the second batteries, and
in a start mode and in a low-speed drive mode, the first motor controller charges the first battery; the second motor discharges the second battery; and the battery management system determines if a state of charge of the second battery is lower than a predefined value.

3. The electric drive system according to claim 1,
wherein, in a high-speed drive mode, the first motor controller discharges the first battery; the second motor controller charges the second battery; and the battery management system determines if a state of charge of the first battery is lower than a predefined value.

4. The electric drive system according to claim 1,
wherein, in the uphill drive mode, the first and second motor controllers discharge the first and the second batteries, respectively; and the battery management system determines if a current and a temperature of the first and the second motors are higher than a predefined current value and a predefined temperature value, respectively, and determines if the torque of the first and the second motors are lower than a predefined value.

5. The electric drive system according to claim 1,
wherein, in the downhill drive mode, the first and the second motor controllers charge the first and the second batteries.

* * * * *